United States Patent [19]

Schandelmeier

[11] Patent Number: 4,776,438

[45] Date of Patent: Oct. 11, 1988

[54] BRAKE ADJUSTMENT INDICATOR

[76] Inventor: John L. Schandelmeier, 18 Dexter La., Kings Park, N.Y. 11754

[21] Appl. No.: 96,076

[22] Filed: Sep. 11, 1987

[51] Int. Cl.[4] ............................................. F16D 66/02
[52] U.S. Cl. ..................................... 188/1.11; 73/709; 116/208
[58] Field of Search ............................. 188/1.11, 71.9; 116/208, 327, 328, 224, 225, 201; 73/709; 33/609, 610; 340/52 A

[56] References Cited

U.S. PATENT DOCUMENTS

| | | | |
|---|---|---|---|
| 1,760,608 | 5/1930 | Ross | 116/224 |
| 1,786,638 | 12/1930 | Wadell | 33/610 |
| 3,438,351 | 4/1969 | Kirkwood | 116/208 |
| 3,633,535 | 1/1972 | Puster | 116/208 |
| 4,279,214 | 7/1981 | Thorn | 188/1.11 |
| 4,499,976 | 2/1985 | Weber | 188/71.9 |

Primary Examiner—Andres Kashnikow
Assistant Examiner—Mark T. Le
Attorney, Agent, or Firm—Bauer & Schaffer

[57] ABSTRACT

A brake adjustment indicator adapted to be mounted to a mounting bracket which supports a brake air chamber on a surface of the mounting bracket opposite the brake air chamber with the brake air chamber having a rod extending therethrough with one end of the rod adjacent the surface and connected by a clevis pin to a brake arm. The brake adjustment indicator comprises a bracket having an elongated body portion and having on one end thereof a base plate positioned generally at right angle to the base portion. The base portion is adapted to be mounted onto the mounting plate. The elongated body portion has an elongated, continuous slot therethrough, which slot is generally parallel to the rod when the base plate is mounted to the mounting plate. The brake adjustment indicator also comprises a pointer adapted to be adjustably mounted in the slot of the body portion. The pointer is mounted in the slot and is in a horizontal plane which is a predetermined distance from the clevis pin in a direction opposite the air chamber when the clevis pin is in its normal, rest position.

13 Claims, 2 Drawing Sheets

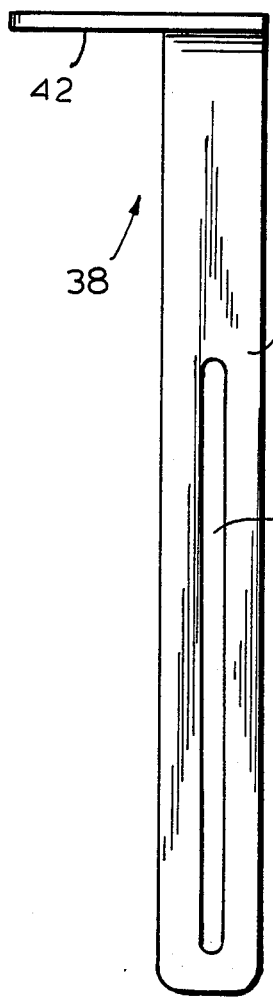
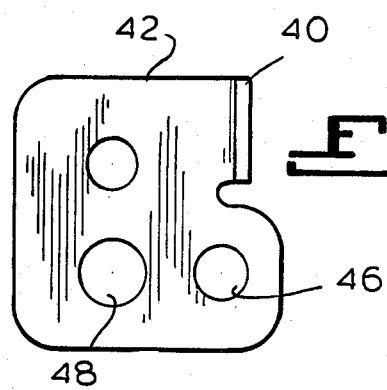
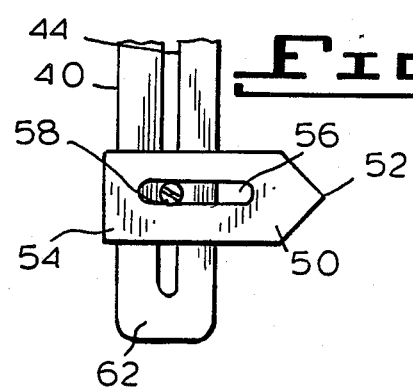
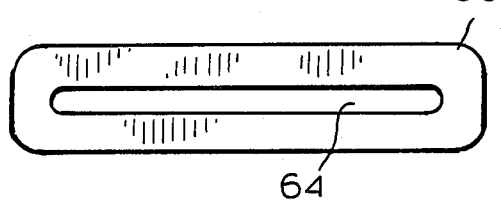

BRAKE ADJUSTMENT INDICATOR

BACKGROUND OF THE INVENTION

1. Field of the Invention

The present invention relates to a brake adjustment indicator and, more particularly, to a brake adjustment indicator for air disc and cam operated brakes for large trucks, trailers and the like.

2. Description of the Prior Art

For many years, it has been appreciated that there is a need to accurately determine whether brakes on trucks, trailers and other such vehicles, have worn to the point where adjustment is needed in order to maintain the brakes in good working order.

However, current braking systems are very difficult to inspect and, therefore, inspection of the systems may not be made as frequently as they should be due to the difficulty attendant with such inspection. Clearly, the potential hazardous condition should the brakes of a vehicle be worn is readily apparent. Accordingly, attempts have been made to develop wear indicator devices which one can readily inspect. However, these devices have generally been rather cumbersome, and require extra, complicated components thereby making them costly, or use elements or component which can readily wear and, therefore, need replacement, or require access to the air chambers or brakes themselves and, therefore, special provisions, which are costly, are needed to make sure the brake components are not adversely effected.

The following are examples of devices having extra components which can readily wear. U.S. Pat. No. 2,644,549 to Cagle, which issued July 7, 1953 is directed to a brake disc wear compensating and indicating means which automatically takes up the clearance between a brake drum and the brake element in response to wear of the brake element by the action of a combined spring return means and an adjustable holding device which presses upon wear indicator means. Analogously, U.S. Pat. No. 3,018,852 to Stanton, which issued Jan. 30, 1962, is directed to a combination retracting mechanism and wear indicator. This indicator, like the indicating means in Cagle, is rather cumbersone and also uses springs. Further, U.S. Pat. No. 4,658,936 to Moseley, which issued Apr. 21, 1987, provides a brake temperature and wear indicator which uses a biasing means, such as a spring, to bias a probe having a thermocouple embedded within to press upon the pressure plate of a multi-disk brake assembly for an aircraft.

An example of a device which requires access to the brakes or air chambers for the brakes is U.S. Pat. No. 4,583,071 to Sebalos, et al., which issued Apr. 15, 1986, which provides a brake adjustment monitoring device for automotive vehicles. The device consists of a magnet adjustably secured to the shaft of the diaphragm within each air chamber.

Along these same lines, U.S. Pat. No. 3,298,466 to Ayers, Jr., et al., which issued Jan. 17, 1967, is directed to a brake wear indicator which consists of an extension of a spring. The spring is located in the housing for the brakes and the wall of the housing has an opening to permit the extension to pass therethrough. U.S. Pat. No. 4,279,214 to Thorn, which issued July 21, 1981, provides a brake wear indicator which is a sleeve that loosely fits over the push rod to the pneumatic actuator of the brakes. However, the sleeve has an outside diameter permitting it to be received in the aperture of the actuator housing which slidably receives the push rod. See also, U.S. Pat. No. 4,186,822 to Khuntia, et al., which issued Feb. 5, 1980, which provides a disk brake wear indicator in which a base is provided in the piston retracting mechanism which includes a spring. Through the base, which is plugged when not in use, a depth measuring device can be inserted to obtain a reading.

Also, see U.S. Pat. No. 4,356,897 to Urban, which issued Nov. 2, 1982, which provides a lining wear indicator for a disc brake. The indicator includes a pair of pins secured at their outboard ends to the respective radially outer ends of the bridge bar and extending axially inboard through aligned bases in the inboard web of the caliper of the brakes.

The only suggestion of an indicator device which neither employs springs which, after use or wear, can stretch and, therefore, need replacing, nor requires entry through the walls of the device to be measured, is U.S. Pat. No. 3,438,351 to Kirkwood, which issued Apr. 15, 1969. This patent, which is not directed to a wear or adjustment indicator for brakes of a vehicle, is directed to means for simultaneously indicating the spacing between two opposed attritioning elements and their condition of wear. Specifically, a rod is attached to the axially-adjustment element of a pair of axially-aligned attritioning elements. A slidable bracket is placed on the rod and the bracket includes a pointer. The pointer is adapted to move over a stationary scale to indicate the actual spacing between the attritioning elements when separated. There is also provided a second scale which is carried on the slidable bracket, and a second pointer fixed on the rod. This second pointer indicates on the second scale the amount of wear of the attritioning elements.

None of the above patents provide a wear indicator device for the brakes of a truck, trailer or the like which does not employ springs and also does not pierce or effect the housing of the brakes or air chamber for the brakes. Further, until the present invention, there was no wear indicator device for brakes of vehicles which requires only relatively simple and inexpensive components which can be readily mounted on the mounting bracket for the brakes and does not effect the housing of the brakes or the brake air chamber.

SUMMARY OF THE INVENTION

A principal object of the present invention is to provide a brake adjustment indicator which one can readily tell when the brakes need adjustment.

Another object of the present invention is to provide such a brake adjustment indicator which is located outside of the brake and air cylinder or chamber housings.

A further object of the present invention is to provide such a brake adjustment indicator which is relatively inexpensive and simple to install.

A yet another object of the present invention is to provide such a brake adjustment indicator which is adjustable so as to be adapted to be used with all types of air disc and cam operated air brake systems.

The foregoing objects and advantages are achieved by a brake adjustment indicator which is adapted to be mounted at one end to a mounting bracket which supports the brake pressure chamber. The brake pressure chamber includes a rod extending through the chamber, with one end of rod connected by a clevis pin to a brake arm. The brake adjustment indicator includes an angle bracket having an elongated arm portion with an elongated, continuous slot therethrough and a base plate. The base plate is mounted to the mounting bracket so that the arm and its continuous slot is generally parallel to the rod. The brake adjustment indicator also includes a digit having a pointer adapted to be adjustably mounted in the continuous slot, wherein the digit is set in the continuous slot so that it is a predetermined distance beyond the clevis pin when the brakes of the vehicle are in the released position. The predetermined distance is measured by the extent to which the rod moves during effective braking operation and beyond which further movement of the rod is indicative of faulty brake system. Thus, by comparing the movement of the rod, relative to the adjusted digit, one can readily see whether or not the braking system of the vehicle needs repair re-adjustment.

BRIEF DESCRIPTION OF THE DRAWINGS

The foregoing and still other objects and advantages of the present invention will be more apparent from the following explanation of the preferred embodiments of the present invention in connection with the accompanying drawings in which:

FIG. 3 is a side plan view of the bracket of the brake adjustment mechanism of FIG. 1;

FIG. 4 is a top plan view of the base plate of the bracket of the brake adjustment indicator of FIG. 1;

FIG. 5 is a side elevational view of the pointer in place on a portion of the bracket of the brake adjustment indicator of FIG. 1; and FIG. 6 is a side plan view of an extension to the bracket of the brake adjustment indicator of FIG. 1.

Before explaining the disclosed embodiment of the present invention in detail, it is to be understood that the invention is not limited in its application to the details of the particular arrangements shown since the invention is capable of other embodiments. Also, the terminology used is for the purpose of description and not of limitation.

DESCRIPTION OF THE PREFERRED EMBODIMENTS

Figure 1:
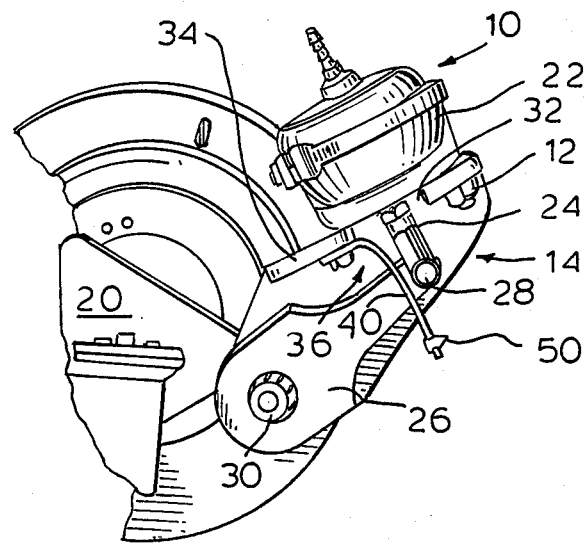
FIG. 1 is a perspective view of the brake adjustment indicator of this invention in place on the mounting brake supporting the brake air chamber.
Figure 2:
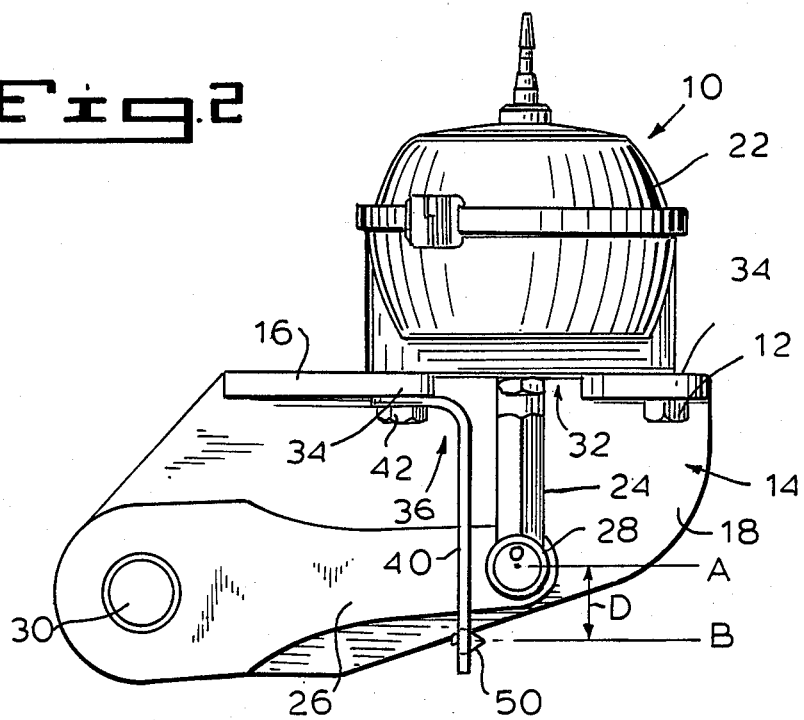
FIG. 2 is an enlarged view of the brake adjustment indicator of FIG. 1, again in place of the mounting brake supporting the brake air chamber.

Referring to the drawings and, in particular, FIGS. 1 and 2, there is provided a brake actuator, generally represented by reference numeral 10 connected by a plurality of studs 12 to a mounting bracket 14. The mounting bracket 14 is L-shaped having a top 16 and a depending plate 18 fixedly mounted to the chasses 20 of the vehicle.

The brake actuator comprises a pressure chamber 22 having a rod 24 which passes through the top and bottom of the pressure chamber 22. The brake actuator 10 as a whole is a conventional hydraulic or pneumatic system of any type known in the art. The pressure chamber 22 communicates with a source of fluid (not shown) and containing a piston (not shown) attached to the interior end of the rod 24, the piston and rod being movable inwardly and outwardly of the chamber on application of brake fluid, by the vehicle's operator. The rod 24 is connected at its outer end to the brake arm 26 of a conventional disc brake system by a clevis pin 28. The brake arm 26 is connected to an axle 30, journalled in the bracket plate 18. The axle 30 is fixed to the brake pad (not shown) of the disc brakes (also not shown) so that actuation of the brake actuator operates to effect braking of the vehicle.

The top 16 of the mounting bracket 14 has a U-shaped cutout 32 through which the rod 24 passes. The studs 12, supporting the chamber 22, pass through the wings 34 of the top 16.

Extending outwardly from the mounting bracket 14 and also connected to the mounting bracket by one of the plurality of studs 12 is the brake adjustment indicator of the present invention, generally indicated by the numeral 36.

As seen in FIGS. 3-5, the brake adjustment indicator 36 comprises an angle bracket 38 consisting of an elongated arm 40 and a base plate 42. The arm 40 is, preferably, integral with and at approximately right angles with respect to the base plate 42 and has a continuous, elongated slot 44 which starts, preferably, two to three inches away from the base plate 42. While the continuous, elongated slot 44 could run closer to the base plate 42, it is preferable that it starts over two inches away from the base plate, since making the elongated arm 40 solid adjacent the base plate 42 makes the bracket 38 less flexible and thereby easier to install and the arm 40 easier to align with the clevis pin 28 as will be discussed later. Since conventional brake rods 24 normally extend out of chamber 22 approximately two inches when the brakes are at rest or released, the slot 44 would serve no purpose should it extend closer to the base plate 42.

As shown in FIG. 4, the base plate 42 includes at least one hole 46 and another hole 48. At least one of the holes 46 or 48 is of a diameter so as to receive one of the plurality of studs 12 therethrough enabling the bracket 38 to be fixed to the mounting bracket 14 in opposition to the pressure chamber 22 with the arm 40 of the bracket 38 extending substantially parallel to the axis of the rod 24, as shown in FIGS. 1 and 2. The holes 46 and 48 are preferably of different diameters so as to receive different diameter studs 12, or additional bolts to further anchor the bracket 38 to the mounting plate 14 and/or to provide for its universal use in varied vehicles or brake systems, having different stud configurations. Further, the holes 46 and 48 should be spaced about the base plate 42 so that the bracket 38 can be mounted on either of the right or left stud 12 selectively placing the elongated arm 40 on the left side of the rod 24 (as shown) or on the right side of the rod 24. In this manner, the same adjustment indicator 36 can be used on any of the wheel brakes of a vehicle.

Preferably, the angle bracket 38, i.e. integral elongated arm 40 and base plate 42 are formed of metal, however, they can be of any material, such as plastic or the like.

Referring to FIGS. 1, 2 and 5, the brake adjustment indicator 36 also includes digit 50, adjustably locatable in the elongated slot 44 of elongated arm 40. The digit 50 has a pointed end 52 and a remaining body 54 which also includes a slot 56 so that it can be secured in place in slot 44 of bracket 38 by the use of one or more conventional nut and bolt assemblies 58 on either face of the bracket. In this manner the digit 50 can be adjustably positioned along the length of the arm 40, as well as transversely thereto to the length.

Referring to FIGS. 1 and 2, the position where digit 50 is located on the arm 40 is determined as follows:

When the brakes are in their rest or release position, the rod 24 and, therefore, clevis pin 28 and brake arm 26 are in their normal released or rest position, which is upward toward the pressure chamber 22 as shown in FIG. 1. From this position, each brake system has a distinctive thrust or stroke of the brake arm 26 within which the brakes are applied and beyond which the disc brakes will not be applied and, therefore, must be readjusted or repaired in order to safely be operational. Since the indicator arm 40 is connected by the clevis 28 to the rod 24, the thrust may be measured by the distance D that the clevis end of the rod 24 moves from its most inward or rest position A to that outward nonoperational position B, using the center of the clevis 28 as the reference point (see FIG. 2). Thus, the effective distance of the thrust or stroke is a predetermined amount which normally is provided by the brake manufacturer during the manufacturing process. Accordingly, by positioning the digit 50 along the slot 44 so that pointed end 52 is aligned with the outward most position B of predetermined distance D, a fixed indication of the extent of the operative thrust will be created, to which reference can be made at any later time.

Once the brake adjustment indicator 36 is installed, it is very easy to subsequently determine whether the brakes need adjustment which may include total replacement or repair. Simply, one merely applies full pressure to the actuator 10 causing the rod 24 to move outward of the chamber 22. Should the movement of the clevis pin 28 not exceed the distance D, namely moving past point B and stop short of the point 52 on the digit 50, then the brakes are within adjustment; however, should the clevis pin 28 move outward past point 52, then the brake is seen to need adjustment, which may include replacement.

Should it be determined, when the bracket 38 be installed on the mounting bracket 14 so that the elongated slot 44 and/or elongated arm 40 is too short for the digit 50 to be positioned in alignment with the extreme point B, an extension 60, shown in FIG. 6, can be connected by conventional nut and bolt means, to the free end 62 of the elongated arm 40 of angle bracket 38. Extension 60, like arm 40, has a continuous, elongated slot 64 through which the digit 50 can be adjustably attached in the manner discussed above.

Analogously, after the digit 50 is positioned in the slot 44 of arm 40, should a large portion of the arm 40 between the free end 62 and the digit 50 remain, that excess portion of the arm 40 can be cut by metal cutters or the like so that it can be removed. Since angle bracket 38 is made of a somewhat rigid material and does not bend, and further since the arm 40 extends substantially parallel to clevis pin 28, the rod 24 and the digit 50 can readily be visually observed from outside the vehicle's perimeter. In this manner, the brake inspector need not climb beneath the vehicle or use rulers or the like to measure the thrust movement of the brake arm. Since the purpose of slot 44 in the arm 40 is to position the digit 50 in alignment with the extreme point B only, it is understood that slot 44 can start over two inches away from base plate 42 providing the bracket 36 with good strength and durability.

It will be seen from the foregoing that the present invention provides an indication system for brake safety and reliability which can be used universally on virtually any large vehicle or truck. The same form and shape of the angle brake is adapted for right and left hand installation relative to the piston rod whether the pressure chamber and piston rod operate in a vertical or horizontal direction. Further, installation can be made with the use of simple, readily available tools and by an unskilled worker, since the installation and operation of the braking system is never tampered with or modified.

It will also be seen that the present invention may be easily employed to retro-fit vehicles, without any need for modification of the vehicle or need to place the vehicle out of action for a lengthy period of time.

The present invention further provides a method for inspecting vehicles, which can be practiced at any time, without the need for complex mechanisms, testing stations or the like. Testing can be made visual, at the side of the road, or at a garage or car parkby the driver, experienced inspector or even a policeman not skilled in brake testing.

Having thus described the invention with particular reference to the preferred forms thereof, it will be obvious that various changes and modifications may be made therein without departing from the spirit and scope of the invention as defined by the appended claims.

Wherefore I claim:

1. An indicator, for indicating the wear condition of a brake of a vehicular braking system adapted to be mounted to a mounting bracket which supports a brake pressure chamber, on a surface of the mounting bracket opposite the chamber, the brake pressure chamber having a piston rod extending outwardly with the extending end of the rod connected by a clevis pin to a brake arm, said indicator comprising:

a bracket having an elongated arm having on one end thereof a base plate positioned generally at right angle to said arm and adapted to be mounted to the mounting bracket so that siad elongatd body arm extends generally parallel to the piston rod;

a digit member adapted to be mounted along the length of said arm at a predetermined distance from the clevis pin in the direction away from the pressure chamber when the piston rod and clevis pin are in their normal retracted position, the relative positions of the digit member and the clevis pin being indicative of the wear condition of the brake of the braking system when said brake pressure chamber is actuated.

2. The brake adjustment indicator according to claim 1 wherein said elongated arm has a length sufficient to extend in parallel to said piston rod and beyond the clevis pin when said rod is moved outward from said pressure chamber, said elongated arm having a continuous slot along its length to receive said digit member and secure said digit member therein.

3. The brake adjustment indicator according to claim 2, further including means for mounting said base plate to the mounting bracket.

4. The brake adjustment indicator according to claim 3, wherein said mounting means is a stud which also secures the pressure chamber to the mounting bracket.

5. The brake adjustment indicator according to claim 2, wherein said base plate has a plurality of holes therethrough, said holes being spaced relative to each other to permit said bracket to be mounted in selected positions on said pressure chamber mounting bracket.

6. The brake adjustment indicator according to claim 1, wherein said bracket is made of metal.

7. The brake adjustment indicator according to claim 1, wherein said bracket is made of plastic.

8. The brake adjustment indicator according to claim 2, further including means for securing said digit member in the continuous slot of said elongated arm of said bracket.

9. The brake adjustment indicator according to claim 1, wherein said digit member includes a body portion having a continuous slot and a pointed end.

10. The brake adjustment indicator according to claim 9, wherein said digit member is mounted in the continuous slot of said body portion by a bolt.

11. The brake adjustment indicator according to claim 2, further including an extension which is adapted to be mounted on the end of said bracket opposite said base plate.

12. Apparatus for retro-fitting a vehicle with a brake adjustment indicator for disc brakes mounted to a mounting bracket having a U-shaped top, the mounting bracket supporting a brake air chamber for the disc brakes and on a surface of the mounting bracket opposite the brake air chamber, the brake air chamber having a rod extending therethrough with one end of the rod being connected by a clevis pin to a brake arm, a plurality of studs passing through the arms of the U-shaped top of the mounting plate to connect the air chamber to the mounting bracket, said bit comprising:

an integral bracket having an elongated body portion, and having at one end thereof a base plate positioned generally at right angles to said body portion, said base plate having at least one hole which is adapted to receive one of the plurality of studs so as to enable mounting of said integral bracket onto the mounting bracket, said elongated body portion having an elongated, continuous slot therethrough, wherein said slot may be arranged generally parallel to the rod; and a pointer mounted on the slot of said body portion in a horizontal plane which is fixedly mounted a predetermined axial distance from the clevis pin the direction opposite the air chamber when the clevis pin is in its normal position, and when the rod is at its full actuation position, the distance between said pointer and said clevis pin provides a visual wear indication of the brake.

13. The method for indicating the wear condition of a brake of large a vehicle such as a truck having a hydraulic or pneumatic braking system, wherein the brake is applied by a piston rod actuated by applying fluid to a pressure chamber comprising the steps of arranging a rigid arm adjacent to and parallel to the piston rod providing said piston rod with a fixed reference at a predetermined point along its length, fixing an indicator on said rigid arm at a distance from the pressure chamber equal to the distance said fixed reference moves when said piston rod travels to effectively cause application of the brake and beyond which movement of the piston rod results in faulty operation of said brake, and thereafter periodically visually monitoring the relationship of said fixed reference and said indicator, on the movement of said piston rod in response to the application of fluid to the pressure chamber.

* * * * *